United States Patent

Maegawa

Patent Number: 5,455,299
Date of Patent: Oct. 3, 1995

[54] AQUEOUS LIQUID FOR PRIMERS

[75] Inventor: Masao Maegawa, Kashiba, Japan

[73] Assignee: National Starch and Chemical Investment Holding Corporation, Wilmington, Del.

[21] Appl. No.: 175,426
[22] PCT Filed: Jun. 17, 1993
[86] PCT No.: PCT/US93/05790
§ 371 Date: Feb. 17, 1994
§ 102(e) Date: Feb. 17, 1994
[87] PCT Pub. No.: WO94/00520
PCT Pub. Date: Jan. 6, 1994

[30] Foreign Application Priority Data

Jun. 18, 1992 [JP] Japan ............... 4-159374

[51] Int. Cl.$^6$ .................... C08L 43/04
[52] U.S. Cl. ............ 524/806; 524/812; 524/816; 524/832
[58] Field of Search ............... 524/806, 812, 524/816, 832

[56] References Cited

U.S. PATENT DOCUMENTS 4,746,552  5/1988  Takumoto et al. .......... 427/393.6

FOREIGN PATENT DOCUMENTS 3229766  10/1991  Japan .
4154874A  2/1992  Japan .
5031459A  2/1993  Japan .

Primary Examiner—Mark Sweet
Attorney, Agent, or Firm—Edwin M. Szala; Ellen T. Dec

[57] ABSTRACT

Aqueous liquid for primers are prepared from a copolymer consisting essentially of the following components (A), (B) and (C) in aqueous medium where (A) is a cationic monomer represented by the following general formula (1)

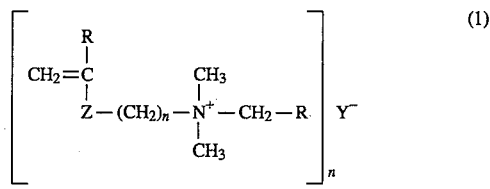

R: —H, —CH$_3$, —C$_2$H$_5$ or —C$_3$H$_7$

Z: —(CH$_2$)$_m$— or —C—NH— or —C—O$_m$—
              ‖                ‖
              O                O wherein Y is organic or inorganic monovalent anion; m is an integer 0 to 3 and n is an integer 1 to 3;

(B) is an alkoxysilane monomer represented as the following general formula (2)

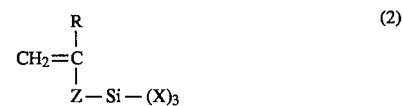

R: —H, —CH$_3$, —C$_2$H$_5$ or —C$_3$H$_7$

Z: —(CH$_2$)$_m$— or —C—O—(CH$_2$)$_m$—
              ‖
              O

X: —OCH$_3$, —OC$_2$H$_5$ or —OC$_2$H$_4$OCH$_3$ and (C) is an ethylenic unsaturated monomer, and wherein a structural unit derived from the (A) component accounts for not less than 5% of the copolymer, a structural unit derived from the (B) component accounts for not less than 0.5% by weight of the copolymer and a structural unit derived from the (C) component accounts for not more than 94.5% by weight of the copolymer.

2 Claims, No Drawings

AQUEOUS LIQUID FOR PRIMERS

FIELD OF THE INVENTION

The present invention relates to aqueous liquid for primers which is applied to improve surface of alkaline porous inorganic base materials such as concrete, mortar and the like.

BACKGROUND OF THE INVENTION

Because their surface layers are fragile, primers are usually applied on the surface of inorganic cement building materials such as concrete, mortar, slate and the like for the purpose of improving the surface reinforcement or adhesive strength to paints for surface finish and the like. Heretofore, solvent primer liquid formed by dissolving synthetic resin into organic solvent has been employed as such primers. However, the solvent primer liquid is easy to ignite because of its volatility and further it affects the human body when the fumes are breathed. Thus, the above solvent primer liquid has many problems from the viewpoints of safety, sanitation, and the like.

The present application has previously developed aqueous liquid for primers wherein water is medium and organic solvent is not employed as medium, and has already applied to the Japanese Patent Office (JPA 62-80694). And, also as a further developed version, he developed one liquid type primer, which is formed by copolymerizing dimethyl aminoalkylamide acrylate or epichlorohydrin adduct of dimethyl aminoalkylamide methacrylate as a function group and alkoxysilane element to be the aqueous resin superior in reinforcement effects of the surface layer of base materials by crosslinking irrespective of the alkaline degree of base materials and already filed an application.

Although the above aqueous liquid can form a coat superior in waterproof by crosslinking under both circumstances of acid and alkali, when the concentration of resin is raised, shelf stability deteriorates due to high viscosity. In addition, it has a defect that the permeability to inorganic building material, reinforcing ability to base materials and waterproof properties deteriorate due to a rise of viscosity.

OBJECT OF THE INVENTION

The object of the present invention is accordingly to provide aqueous liquid for primers superior in permeability and reinforcing ability to base materials and waterproof properties by forming resin liquid in high concentration and low viscosity without loss of crosslinking reaction.

SUMMARY OF THE INVENTION

In the first aspect, this invention relates to the aqueous liquid for primers, which contains a copolymer mainly formed with the following component (A), (B) and (C) in aqueous medium, where (A) is a cationic monomer represented as the following general formula (1)

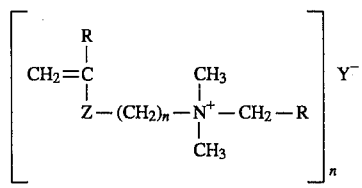

R: —H, —CH$_3$, —C$_2$H$_5$ or —C$_3$H$_7$

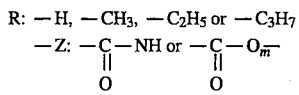

wherein Y is organic or inorganic monovalent anion; m is an integer 0 to 3 and n is an integer 1 to 3.

(B) is an alkoxysilane monomer represented as the following general formula (2)

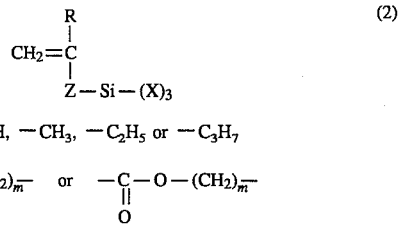

R: —H, —CH$_3$, —C$_2$H$_5$ or —C$_3$H$_7$

Z: —(CH$_2$)$_{\overline{m}}$— or —C(=O)—O—(CH$_2$)$_{\overline{m}}$—

X: —OCH$_3$, —OC$_2$H$_5$ or —OC$_2$H$_4$OCH$_3$ and (C) is an ethylenic unsaturated monomer; and wherein a structural unit derived from the (A) component accounts for not less than 5% (by weight; the same applies hereinafter) of the copolymer, a structural unit derived from the (B) component accounts for not less than 0.5% of the copolymer and a structural unit derived from the (C) component accounts for not more than 94.5% of the copolymer.

In addition, in the second aspect, the invention relates to the aqueous liquid for primers which contains dispersedly a polymer found by polymerizing ethylenic unsaturated monomer in the above aqueous liquid.

That is, the invention has performed a series of studies focused on water soluble resin, especially acrylic resin, to find an aqueous liquid for primers, which forms a strong coat having durability irrespective of types of base materials (inorganic building materials) and furthermore is superior in waterproof properties by forming high-concentrated and low viscous resin liquid. He found out that, as a result, when special monomers (component A and component B) represented as the above general formula (1) and (2), and an ethylenic unsaturated monomer (component C) are polymerized at a specific ratio, a chain polymer obtained shows a good solubility in water and furthermore the aqueous solution penetrates the surface layer of base material very well so as to reinforce the basic material surface strongly, and at the same time to form a coat superior in waterproof and alkali resistance. Furthermore, he found out that high concentrated and low viscous resin liquid was realized by polymerization with cationic monomer represented as the above general formula (1), without deteriorating the speed of crosslinking reaction compared with prior methods, so that even in a coating condition of high concentration, permeability to inorganic building materials remains favorable, and adequate reinforcement toward basic materials and waterproof were given.

In addition, it was found out that similar effect was obtained in polymerizing the above ethylenic unsaturated monomer solely by emulsion polymerization and the like then mixing it with liquid of (A)+(B)+(C) which contains a copolymer.

DETAILED DESCRIPTION OF THE PREFERRED EMBODIMENTS

In the present invention, water is the most preferably as medium. However, for the purpose of heightening the solubility of a cationic monomer for copolymerization or increasing the permeability to a basic material, it is possible to use water jointly with organic solvent easily soluble in water at the same time. And also, it is possible to use organic solvent only, easily soluble in water. As such organic solvents, isopropyl alcohol, methanol, ethanol, propanol, acetone, methyl ethyl ketone, dioxane, ethylene glycol, propylene glycol, glycerin, methyl carbitol, ethyl carbitol, butyl carbitol, methyl cellosolve, ethyl cellosolve, acetic acid, acetic acid esters of the above alcohol, acetic acid esters of the above carbitol, acetic acid esters of the above cellosolve and the like are available. In using such organic solvents together at the same time, from the viewpoint of safety of aqueous liquid obtained, it is preferable that a ratio of organic solvent in total medium is not more than 50% (by weight; the same applies hereinafter) and it is further preferable that the ratio is not more than 20%. In using the above organic solvents, it is possible to withdraw the organic solvents by distillation and the like after finishing polymerization reaction.

Further, as a cationic monomer (component A) represented as the above general formula (1), methyl chloride salt of dimethylaminopropyl methacrylamide, acetate of dimethylaminopropyl methacrylamide, sulfate of dimethylaminopropyl methacrylamide, nitrate of dimethylaminopropyl methacrylamide, formate of dimethylaminopropyl methacrylamide, propionic acid salt of dimethylaminopropyl methacrylamide, ethyl chloride salt of dimethylaminopropyl methacrylamide, methyl bromide salt of dimethylaminopropyl methacrylamide, ethyl bromide salt of dimethylaminopropyl methacrylamide, methyl iodide salt of dimethylaminopropyl methacrylamide, methyl nitrate of dimethylaminopropyl dimethylacrylamide, ethyl nitrate of dimethylaminopropyl dimethylacrylamide, dimethyl sulfate of dimethylaminopropyl methacrylamide, diethyl sulfate of dimethylaminopropyl methacrylamide, hydrochloride of dimethylaminopropyl methacrylamide, hydrobromic acid salt of dimethylaminopropyl methacrylamide, hydroiodic acid salt of dimethylaminopropyl methacrylamide are available.

It is required that the above cationic monomer should be compounded at a ratio of not less than 5% of total monomer (component A+ component B+ component C). That is, when the ratio of cationic monomer is less than 5%, the strength of the coat obtained and the adhesive strength with surface finish and adhesive agent may not be adequate.

On the other hand, as an alkoxysilane monomer (B component) represented as the above general formula (2), 3-metharyloxy propyl trimethoxysilane, vinyl trimethoxysilane, vinyl triethoxysilane, vinyl trimethoxyethoxysilane, 3-methacryloxypropyl triethoxysilane, vinyl tetramethylene trimethoxysilane, vinyl octamethylene trimethoxysilane, allyl trimethoxysilane, allyl triethoxysilane are available. It is required that the above alkoxysilane monomer should be compounded at a ratio of not less than 0.5% of total monomer (A component+ B component+ C component). That is, when the ratio of alkoxysilane monomer is less than 0.5%, the strength of the coat obtained and the adhesive strength and glued connection with surface finish and adhesive agent may not be adequate, as the same as the above cationic alkali crosslinkable monomer.

Furthermore, as an ethylenic unsaturated monomer (C component), which can be used together with the above A component and B component, hydrophobic monomers such as vinyl acetate, alkyl acrylate esters, alkyl methacrylate esters, styrene, acrylonitrile, methacrylonitrile are available. Either of sole use of these or combination use of two or more will do. And also, in case of preparing a polymer with the above ethylenic unsaturated monomer, hydrophilic monomers such as acrylic acid, methacrylic acid, amides acrylate or methacrylate, methylol amides, alkoxymethyl amides, alkyl amino esters, vinyl monochloroacetate, methyl methacrylate, butyl acrylate, 2-ethyl hexyl acrylate and the like may be used together with the above hydrophobic monomer at the same time. Either of sole use or two or more will do in this case, too. Of course, the above hydrophilic monomers should be used within a limit so that the produced polymer may not be soluble in aqueous medium.

When the above ethylenic unsaturated monomers are copolymerized with the above (A) component and (B) component, adhesive strength and glued connection with basic material surface, surface finish paint, adhesive and the like will be further improved. In this case, it is required that the above ethylenic unsaturated monomer should be compounded at the ratio of not less than 94.5% of the total monomer (A component+ B component+ C component).

It is also possible to accomplish the invention by mixing the medium containing a copolymer made from (A)+ (B)+ the above ethylenic unsaturated monomer with a polymer (emulsion) made from the above ethylenic unsaturated monomer, the same effect can be obtained. In this case, it is preferable that a polymer (emulsion) (X) made from the ethylenic unsaturated monomer should be compounded to the above medium containing a copolymer made from A component+ B component+ C component at the ratio of X/Y= 0/100 to 90/10.

Aqueous liquid for primers in the present invention can be made from the above medium and each monomer, for example, in the following method. That is, first of all, polymerization initiator is added into water, organic solvent, or mixture of water and organic solvent as a polymerization medium, and then the above cationic monomer, alkoxysilane monomer and ethylenic unsaturated monomer are dropped to polymerize at the temperature of 60° to 90° C. over a period of 1 to 5 hours, as maintaining the chemical system in acid condition. If necessary, chain transfer agent such as lauryl mercaptane, 2-mercaptoethanol and the like should be added in advance to adjust molecular weight. And also, it is possible to add a variety of addition agents, for example, film making assistant, such as butyl cellosolve, butyl carbitol, and acetate, antifoaming agent, pigment, viscosity inhibitor and the like, should be added as necessity requires. Thus the aqueous liquid for primers, which is the object, can be obtained.

In addition, in case of emulsion polymerizing the ethylenic unsaturated monomer separately, publicly known prior method for emulsion polymerization is available. And then emulsion obtained should be mixed with the medium containing the above copolymer (a copolymer comprising A+ B+ the ethylenic unsaturated monomer) so that aqueous liquid for primers as an object can be materialized.

Further, it is required to selectively use medium which does not inhibit polymerization in the above method. As the above polymerization initiator, azobis isobutyronitrile, benzoyl peroxide (2,2'-azobis-amino-dipropane hydrochloride, ammonium persulfate and the like can be available. Furthermore, it is important to maintain the above medium in acid condition because it prevents chemical system from gelatinization. As acid for adjusting pH, organic acid such as formic acid, acetic acid, oxalic acid and the like, and inorganic acid such as hydrochloric acid, sulfuric acid, nitric acid and the like can be available.

Aqueous liquid for primers obtained in the above can be applied to surfaces of inorganic basic materials such as concrete, mortar, slate plates, light weight calcium plates, ALC plates and the like as primer. This coating liquid can quickly penetrate the surface layer of basic materials as the medium penetrates, and in a drying process, function group activated by alkali and water makes crosslinking formation so that a strong coat of three dimensional network structure superior in waterproof and alkali resistance can be formed. As a results, strong and durable reinforcement can be realized as strong as in the case that solvent primer liquid is used.

Still furthermore, aqueous liquid for primers in the present invention is superior from viewpoint of safety and public nuisance prevention without volatilization of poisonous solvent because hydrophilic medium is adopted. Even furthermore, since cation accounts for a portion of constitutional ingredients of aqueous liquid in the present invention, affinity and adhesion to paint for surface finish or adhesive agent, coated on the primer layer, are superior thanks to the characteristic of cation, so that the surface finish layer can be attached strongly to the basic materials.

EXAMPLE 1–9, COMPARATIVE EXAMPLE A–E 86 parts by weight (abbreviated as parts hereinafter) of isopropyl alcohol was charged into a four-neck flask installed with dispersing blades, a thermometer and a reflux condenser and the 0.9 parts of azobis isobutyronitrile as polymerization initiator, 1.0 parts of lauryl mercaptan, 1.0 parts of acetic acid as pH adjuster were added thereto. Monomer raw materials composed of ingredients shown in the following table 1 to 3 were charged into a dropping funnel and then dropped at the refluxing temperature for isopropyl alcohol over a period of 4 hours with dispersing in order to polymerize and further 0.1 parts of azobis isobutyronitrile was added thereto for complete reaction for two hours. And then 240 parts of water was charged thereto to dissolve resin uniformly, and then isopropyl alcohol was withdrawn at 65° C. under reduced pressure. Each liquid containing a polymer thus obtained was uniform solution wherein the concentration of the polymer was 30%, viscosity was 50 to 100 cps (BM type viscometer, 30° C.) and pH was 3.5 to 4.0.

TABLE 1

|  |  |  | Example |  |  |  |  |
|---|---|---|---|---|---|---|---|
|  |  |  | 1 | 2 | 3 | 4 | 5 |
| Monomer composition (parts by weight) | A component | Methyl chloride salt of dimethylaminopropyl methacrylamide | 5 | — | 20 | — | 75 |
|  |  | Acetate of dimethylaminopropyl methacrylamide | — | 5 | — | 20 | — |
|  | B component | 3-methacryloxypropyl trimethoxy silane | 0.5 | 0.5 | 3 | 3 | 5 |
|  |  | vinyl trimethoxy silane | — | — | — | — | — |
|  | Unsaturated monomer | methyl methacrylate | 49.5 | 49.5 | 32 | 32 | — |
|  |  | butyl acrylate | 20 | 20 | 20 | 20 | 20 |
|  |  | 2-ethyl hexyl acrylate | 20 | 20 | 20 | 20 | — |
|  |  | styrene | 5 | 5 | 5 | 5 | — |

TABLE 2

|  |  |  | Example |  |  |  |
|---|---|---|---|---|---|---|
|  |  |  | 6 | 7 | 8 | 9 |
| Monomer Composition (parts by weight) | A component | Methyl chloride salt of dimethylaminopropyl methacrylamide | — | 75 | 20 | — |
|  |  | Acetate of dimethylaminopropyl methacrylamide | 75 | — | — | 5 |
|  | B component | 3-methacryloxy propyl trimethoxy silane | 5 | — | — | — |
|  |  | vinyl trimethoxysilane | — | 5 | 3 | 0.5 |
|  | Unsaturated monomer | methyl methacrylate | — | — | 32 | 49.5 |
|  |  | butyl acrylate | 20 | 20 | 20 | 20 |
|  |  | 2-ethyl hexyl acrylate | — | — | 20 | 20 |
|  |  | styrene | — | — | 5 | 5 |

TABLE 3

|  |  |  | Comparative Examples |  |  |  |  |
|---|---|---|---|---|---|---|---|
|  |  |  | Example |  |  |  |  |
|  |  |  | A | B | C | D | E |
| Monomer Composition (parts by weight) | A component | Methyl chloride salt of dimethylaminopropyl methacrylamide | 5 | — | 3 | — | 2 |
|  |  | Acetate of dimethylaminopropyl methacrylamide | — | 5 | — | 3 | — |

TABLE 3-continued

| | | Comparative Examples Example | | | | |
|---|---|---|---|---|---|---|
| | | A | B | C | D | E |
| B component | 3-methacryloxy propyl trimethoxy silane | 0.3 | 0.3 | 0.5 | 0.5 | — |
| | vinyl trimethoxysilane | — | — | — | — | 0.5 |
| Unsaturated monomer | methyl methacrylate | 49.7 | 49.7 | 51.5 | 51.5 | 51.5 |
| | butyl acrylate | 20 | 20 | 20 | 20 | 20 |
| | 2-ethyl hexyl acrylate | 20 | 20 | 20 | 20 | 20 |
| | styrene | 5 | 5 | 5 | 5 | 5 |

All samples in these examples and comparative examples were applied to two kinds of asbestos cement calcium silicate plates (one was pH of 9, the other was pH of 7, specific gravity was 0.7 for both) at the ratio of 15% concentration and 100 g/m² and then let them alone to dry at room temperature for 7 days. Later, the were divided into twenty five pieces of micro partition in 4 mm×4 mmm wherein gridiron pattern was made. After adhesive tape (Nichiban brand cellophane tape of 24 mm in width) was attached thereto and peeled off, the number of micro partition remained on the part of basic materials was counted. Adhesive property with primer layer and paint for finish surface was valued thereby. In addition, all the samples were dipped into warm water of 60° C. for 7 days after drying prior to dividing into partitions and then warm water resisting adhesion was valued in the same method as above. As a result of the above adhesive test, the samples with not less than 23 left adhered were represented as ⊙, the samples with 20 to 22 as ○, the samples with 10 to 19 as ⊖, the samples with not more than 9 as ⊗. These results are shown in the following Tables 4 to 7.

Furthermore, all samples of the above examples and comparative examples were applied to slate plates at the ratio of 15% concentration and 100 g/m² and then left alone for drying at room temperature for 7 days. Later, waterproofing test was performed in accordance with JISA-6910. Samples wherein volume of water permeability one day after were not more than 1 cc were represented as ⊙, not more than 3 cc as ○, not more than 5 cc as ⊖, not less than ⊗. These results are also shown in the following Tables 4 to 7.

TABLE 4

| | | Example | | | |
|---|---|---|---|---|---|
| | | 1 | 2 | 3 | 4 |
| Asbestos cement calcium silicate plates (basic material surface layer pH = 9) | Adhesion in normal condition | ⊙ | ⊙ | ⊙ | ⊙ |
| | Adhesion in warm water | ⊙ | ⊙ | ⊙ | ⊙ |
| Asbestos cement calcium silicate plates (basic material surface layer pH = 7) | Adhesion in normal condition | ⊙ | ⊙ | ⊙ | ⊙ |
| | Adhesion in warm water | ⊙ | ⊙ | ⊙ | ⊙ |
| Slate plates | Waterproof | ⊙ | ⊙ | ⊙ | ⊙ |

TABLE 5

| | | Example | | | |
|---|---|---|---|---|---|
| | | 5 | 6 | 7 | 8 |
| Asbestos cement calcium silicate plates (basic material surface layer pH = 9) | Adhesion in normal condition | ⊙ | ⊙ | ⊙ | ⊙ |
| | Adhesion in warm water | ⊙ | ⊙ | ⊙ | ⊙ |
| Asbestos cement calcium silicate plates (basic material surface layer pH = 7) | Adhesion in normal condition | ⊙ | ⊙ | ⊙ | ⊙ |
| | Adhesion in warm water | ⊙ | ⊙ | ⊙ | ⊙ |
| Slate plates | Waterproof | ⊙ | ⊙ | ⊙ | ⊙ |

TABLE 6

| | | Example | Comparative Example | | |
|---|---|---|---|---|---|
| | | 9 | A | B | C |
| Asbestos cement calcium silicate plates (basic material surface layer pH = 9) | Adhesion in normal condition | ⊙ | ⊙ | ⊙ | ○ |
| | Adhesion in warm water | ⊙ | ○ | ○ | ⊖ |
| Asbestos cement calcium silicate plates (basic material surface layer pH = 7) | Adhesion in normal condition | ⊙ | ⊙ | ⊙ | ○ |
| | Adhesion in warm water | ⊙ | ○ | ○ | ⊗ |
| Slate plates | Waterproof | ⊙ | ○ | ⊖ | ⊖ |

TABLE 7

|  |  | Comparative Example | |
|---|---|---|---|
|  |  | D | E |
| Asbestos cement calcium silicate plates (basic material surface layer pH = 9) | Adhesion in normal condition | ○ | ○ |
|  | Adhesion in warm water | ⊖ | ⊖ |
| Asbestos cement calcium silicate plates (basic material surface layer pH = 7) | Adhesion in normal condition | ○ | ○ |
|  | Adhesion in warm water | ⊗ | ⊗ |
| Slate plates | Waterproof | ⊗ | ⊗ |

From the results of the above Tables 4 to 7, it is found out that every samples of examples has superior properties compared with comparative examples.

EXAMPLES 10 TO 12, COMPARATIVE EXAMPLE F

An emulsion polymer (emulsion A) was produced in the following composition, and then mixed with the samples gained in the above example 2 in accordance with the composition of Table 8 shown later, so that aqueous liquid for primers was obtained.

| <Composition of Emulsion A> | |
|---|---|
| Butyl acrylate | 50 parts |
| Methyl methacrylate | 48 parts |
| Dimethyl diallyl ammonium chloride | 2 parts |
| Emulgen 935 (Product of Kao) | 4 parts |
| Water | 156 parts |
| Ammonium persulfate | 0.3 parts |
| <General Characteristic of Emulsion A> | |
| Non-volatile residue | 38.2% |
| Viscosity | 200 cps |
| pH | 2.8 |
| Lowest temperature for making film | 5° C. |

Next, as for aqueous liquid for primer obtained in the above method, the characteristics (adhesive test in normal conditions and warm water, waterproofing test) were valued in the same method of Example 1. The results were also shown in the following Table 8.

From the results of the above Table 8, it is found out that when an unsoluble polymer emulsion was separately produced, and then mixed with the samples of the above examples, preferable liquid for primers can also be obtained.

EFFECTS OF THE INVENTION

Aqueous liquid for primers in the present invention contains a copolymer composed of two kinds of special monomers (A component and B component) and an ethylenic unsaturated monomer (C component) at a specific ratio, wherein a strong coat superior in waterproof and alkali resistance property by crosslinking reaction can be formed irrespective of the degree of alkali of basic materials. In addition, resin in high concentration and low viscosity can be materialized without deteriorating the speed of crosslinking reaction compared with prior method, so that is has superior permeability to the basic materials, adequate reinforce ability to basic materials and waterproof under high concentration condition. Therefore, in spite of aqueous property, it shows a superior reinforcing effect to basic materials, which is not less than that of prior solvent type primers, and furthermore, is safe and does not become a source for public nuisance. In addition, it shows affinity to paints for surface finish, adhesives, or the like and has superior effects to strongly attach the finishing layer comprising the above component on the surface of basic material.

What is claimed is:

1. Aqueous liquid for primers, which contains a copolymer consisting essentially of the following components (A), (B) and (C) in aqueous medium where (A) is a cationic monomer represented by the following general formula (1)

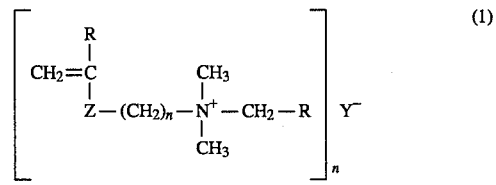

R: $-H$, $-CH_3$, $-C_2H_5$ or $-C_3H_7$

TABLE 8

|  |  | Example | | | Comparative Example |
|---|---|---|---|---|---|
|  |  | 10 | 11 | 12 | F |
| Mixture of composition (parts by weight) | Aqueous liquid of Example 2 | 75 | 50 | 25 | — |
|  | Emulsion A | 25 | 50 | 75 | 100 |
|  | Pondage | 150 | 125 | 100 | 100 |
| Concentration (%) |  | 18.8 | 19.6 | 20.5 | 19.0 |
| Asbestos cement calcium silicate plates (basic material surface layer pH = 9) | Adhesion in normal condition | ⊙ | ⊙ | ⊙ | ⊗ |
|  | Adhesion in warm water | ⊙ | ⊙ | ⊙ | ⊗ |
| Asbestos cement calcium silicate plates (basic material surface layer pH = 7) | Adhesion in normal condition | ⊙ | ⊙ | ⊙ | ⊗ |
|  | Adhesion in warm water | ⊙ | ⊙ | ⊙ | ⊗ |
| State plates | Waterproof | ⊙ | ⊙ | ⊙ | ⊗ |

-continued $$Z: -(CH_2)_m \text{ or } -\underset{\underset{O}{\|}}{C}-NH \text{ or } -\underset{\underset{O}{\|}}{C}-O_{\overline{m}}$$

wherein Y is organic or inorganic monovalent anion; m is an integer 0 to 3 and n is an integer 1 to 3;

(B) is an alkoxysilane monomer represented as the following general formula (2)

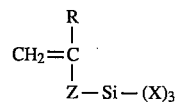 (2)

R: $-H, -CH_3, -C_2H_5$ or $-C_3H_7$ $$Z: -(CH_2)_{\overline{m}} \text{ or } -\underset{\underset{O}{\|}}{C}-O-(CH_2)_{\overline{m}}$$

X: $-OCH_3, -OC_2H_5$ or $-OC_2H_4OCH_3$ and (C) is an ethylenic unsaturated monomer; and wherein a structural unit derived from the (A) component accounts for not less than 5% of the copolymer, a structural unit derived from the (B) component accounts for not less than 0.5% by weight of the copolymer and a structural unit derived from the (C) component accounts for not more than 94.5% by weight of the copolymer.

2. Aqueous liquid for primers which contains a dispersion of a copolymer formed according to claim 1.

* * * * *